March 6, 1951 J. J. PACHTER 2,543,930
WHEEL SPRINGING INSTALLATION
Filed Sept. 12, 1946 2 Sheets-Sheet 1

INVENTOR:
JOHN J. PACHTER
BY
ATTORNEYS.

March 6, 1951 J. J. PACHTER 2,543,930
WHEEL SPRINGING INSTALLATION
Filed Sept. 12, 1946 2 Sheets-Sheet 2

INVENTOR:
JOHN J. PACHTER
BY
ATTORNEYS.

Patented Mar. 6, 1951

2,543,930

UNITED STATES PATENT OFFICE 2,543,930

WHEEL SPRINGING INSTALLATION

John J. Pachter, Harvey, Ill.

Application September 12, 1946, Serial No. 696,423

8 Claims. (Cl. 105—180)

My invention relates to the trucks of light weight railway cars, and more particularly to the wheels forming parts thereof, and one object is to provide independent springing of an efficient nature for the same.

A further object is to design a compact springing unit which is curved to lie and operate close to the center of the wheel.

Another object is to design the shock-absorbing element as a long spring for maximum flexibility, but dispose the spring in a minimum of space by curving the same adjacent to the inner side of the wheel.

A still further object is to design a springing mechanism which limits rebounds resulting from sprung weight passing the point of equilibrium.

With the above objects in view and any others which may suggest themselves from the description to follow, a better understanding of the invention may be had by reference to the accompanying drawings, in which—

Figure 1:
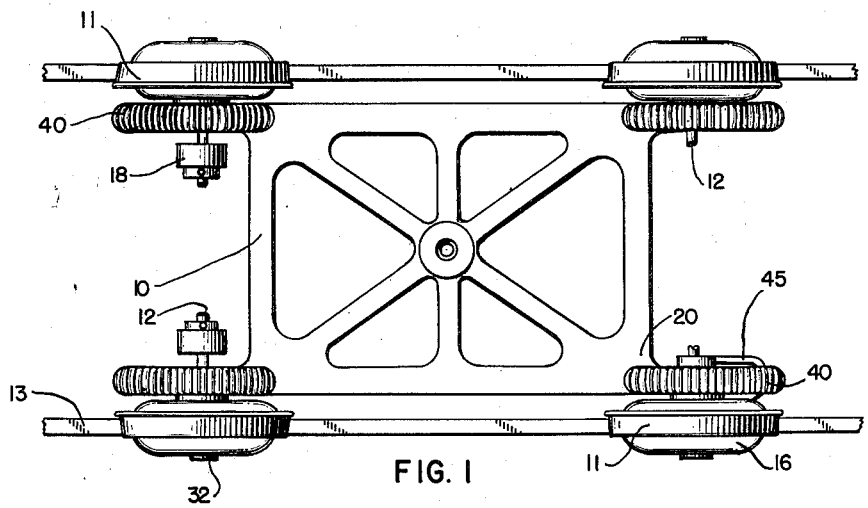
Fig. 1 is a top plan view of a truck showing the novel springing installation applied to all the wheels.

Referring specifically to the drawings, a typical truck for light railway cars is shown at 10, the wheels at 11, and the axles at 12. Fig. 1 shows the truck riding on track rails 13, while Figs. 2, 4 and 5 merely indicate the roadway as a line.

For the purpose of the invention the wheels are ring-shaped; and they receive outer filler plates 16, each of these carrying an axle 12. As indicated in Fig. 1, one axle may receive braking equipment 18; and another axle may receive in addition a gearing (not shown) to drive an electric current generator.

The connections to the wheels extend from the corner pieces 20 of the truck. Thus, each piece is extended with a massive ring 21 in which is tightly fitted the inner end portion of a cylindrical tube 22. Such end portion slidably receives an eccentric plug 23 which contains a ball bearing 24 for the axle 12.

The outer portion of the tube 22 freely receives a thin external bushing 26 which is carried by a hub 27 for the wheel 11. The hub is extended with a web 27a forming an eccentric rim 28; and a double-roller bearing 29 occurs between the rim and the wheel. The latter receives a dust cover 30, secured by screws 31, over the bearing 29.

Figure 2:
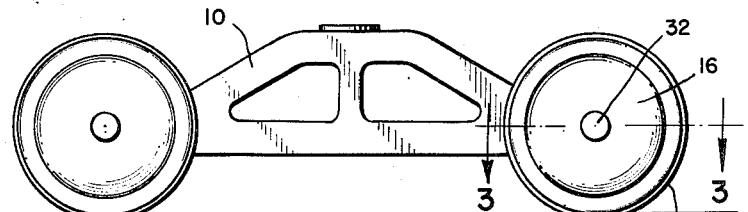
Fig. 2 is a side elevation.
Figure 3:
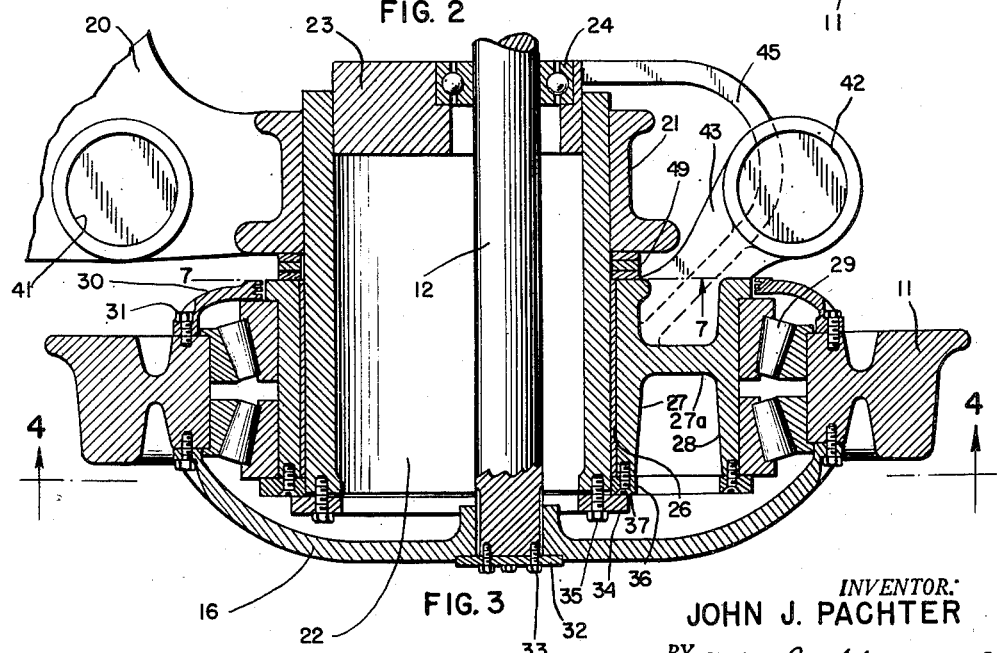
Fig. 3 is an enlarged section on the line 3—3 of Fig. 2 showing the installation for one wheel.

Figs. 2 and 3 show that a center cap 32 applies to the filler plate 16; and the latter figure shows that the cap is held to the axle 12 by bolts 33, the cap being countersunk into the filler plate to retain the same to the axle. Fig. 3 also shows that an outer ring 34 is adjustable by means of bolts 35 in respect to the outer end of the tube 22 and to serve as a retainer for the hub 27 and the bushing 26 through the agency of an inner ring 36 secured by screws 37 to the hub.

Figures 4, 5, 6, 7:
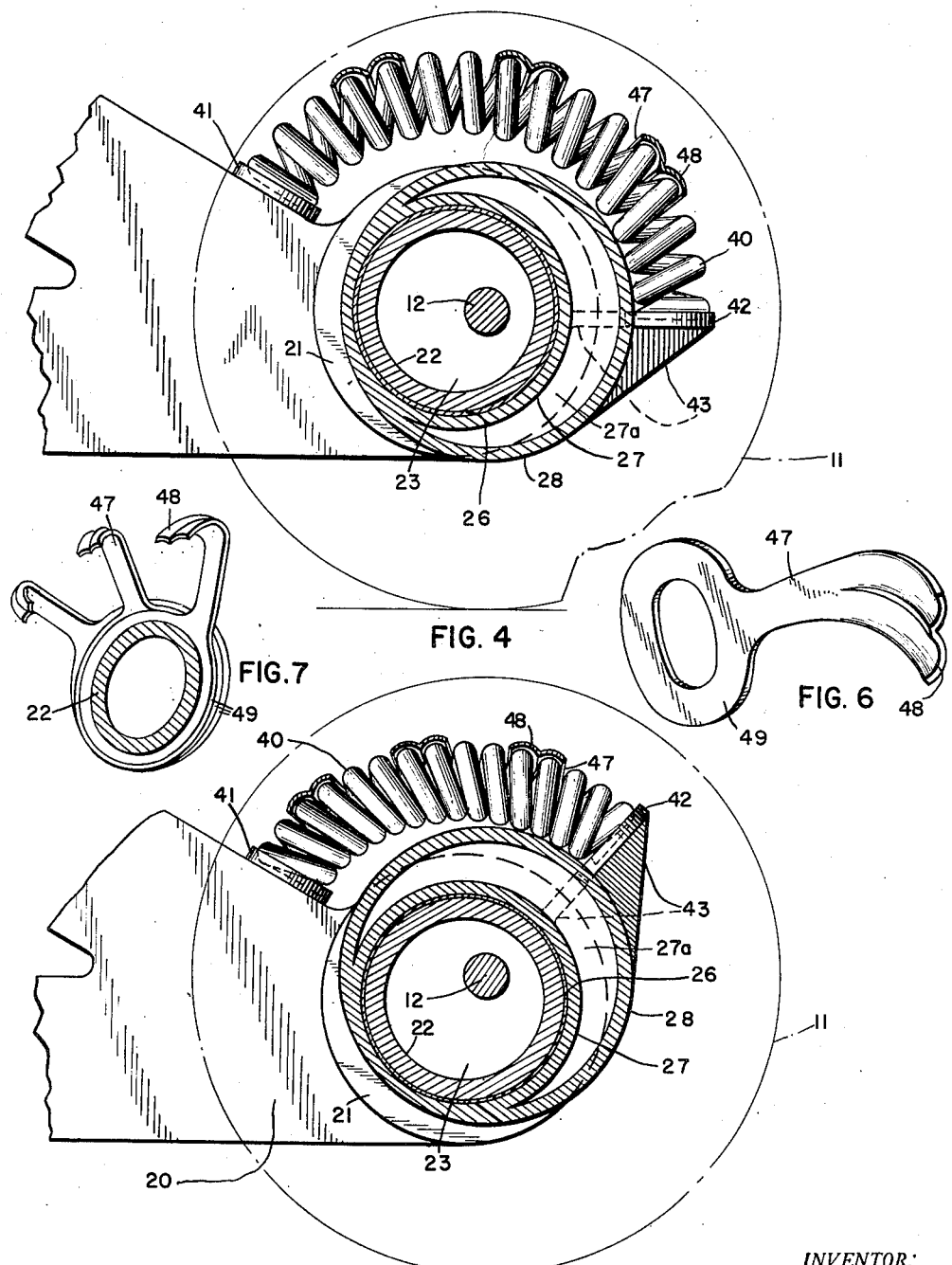
Fig. 4 is a partial section on the line 4—4 of Fig. 3, showing the installation under normal riding conditions.
Fig. 5 is a similar view, showing the installation when the wheel receives a road shock.
Fig. 6 is a perspective view of a spring retainer.
Fig. 7 is a perspective view, on a reduced scale, taken on the section line 7—7 of Fig. 3.

It is noted from Fig. 3 that the ring 21 and tube 22 actually form the supports for the wheel 11, but that the latter has been off-set to one side by the development of the eccentric rim 28. While the wheel is free to roll around this rim, the latter is also rotatable about the tube 22. The partial rotation of the rim from the normal position of Fig. 4 to any position approaching that of Fig. 5 is utilized for the application of a springing medium, the same being a heavy compression spring 40. Thus, the corner piece 20 of the truck has a seat 41 for one end of the spring; and the latter is arched to direct its opposite end into a seat 42 projected by a bracket 43 from the rim 28.

With the wheel 11 normally centered at one side of the axis of the tube 22, it will be apparent that a road shock from either traveling direction will serve to raise the wheel from the position of Fig. 4 to one such as in Fig. 5, compressing the spring 40 as indicated. The wheel is thus sprung independently of the other wheels and to an extent in proportion to the amount of road shock it receives. While spiral springs have been employed for resisting shocks in eccentrically mounted wheels, one advantage in the use of a helical spring is its suitability in compact form for a heavy truck load, as a larger and more cumbersome spiral spring would be required to attain a comparable capacity.

Since the bearing 24 must follow the position of the axle 12 carried by the wheel 11, the supporting eccentric plug 23 for the bearing is rotatable jointly with the hub 27 by receiving a connection 45 from the same. Also, since the shaft 12 is located nearer to one side of the tube 22 in order to center the wheel on the enlarged hub, the eccentricity of the plug 23 to the shaft is necessarily in a direction opposite from the hub enlargement.

While the curved course of the spring enables it to combine maximum length with compactness, it is possible that the spring may buckle when it is suddenly or extremely compressed. To counteract such a tendency a series of L-shaped retainers 47 are provided. The head 48 of each retainer is preferably of twin-trough formation to engage a pair of spring coils on the outer side. The base of each retainer is a flat ring 49; and Figs. 3 and 7 show that the rings of three retainers are grouped for free rotation along the outside of the tube 22 between the ring 21 and the hub 27. The retainers are thus supported by and extend radially from the tube 22. They serve to check only the outward or abnormal tendencies of the spring, but swing easily with the spring when it moves in its normal or circular path. Therefore, the retainers do not detract from the operative efficiency of the spring.

It is now apparent that the novel installation supports each wheel from the related corner of the truck, and does not provide the axles for the joining of pairs of wheels, as is the usual practice. On the contrary, the wheels are simply supported by the truck and carry individual axles merely for driving accessory units, such as generators, or receiving braking equipment. Thus, each wheel is a unit which is independently sprung from the related corner piece of its truck. Therefore, shocks received by one wheel are not transmitted to the other truck wheels, enabling the truck to ride smoothly in such event. While the structural efficiency of the springing means has been made clear, it is also apparent that the form of the springs enables them to be nested compactly on the inner sides of the wheels, leaving ample space between each pair of wheels for accessory equipment. Finally, it is evident that the installation for each wheel is of a simple and sturdy character.

While I have described the invention along specific lines, various minor changes or refinements may be made therein without departing from its principle, and I reserve the right to employ such changes and refinements as may come within the scope and spirit of the appended claims.

I claim:

1. The combination with a railway car truck, and a wheel applied to the same; of means for springing said wheel comprising an extension from the truck along the inner side of each wheel, the latter being chambered, a tube carried by the extension and directed into the wheel, said tube having its axis parallel to that of the wheel, a filler plate for the wheel and carried thereby, a shaft extended inwardly from the center of the filler plate, a bearing for the shaft carried by said tube, a hub rotatable about the tube and formed with an eccentric enlargement, bearing means between the enlarged hub and the rim of the wheel, and means between said extension and the eccentric portion of the hub enlargement resistant to the tendency of the hub to rotate from the influence of road shocks.

2. The combination with a railway car truck, and a wheel applied to the same; of means for springing said wheel comprising an extension from the truck along the inner side of each wheel, the latter being chambered, a tube carried by the extension and directed into the wheel and having an axis parallel to that of the wheel, a filler plate for the wheel and carried thereby, a shaft extended inwardly from the center of the filler plate, a closure plug carried by the inner end of the tube, a bearing for the shaft carried by said plug, a hub rotatable about the tube and formed with an eccentric enlargement, bearing means between the enlarged hub and the rim of the wheel, and means between said extension and the eccentric portion of the hub enlargement resistant to the tendency of the hub to rotate from the influence of road shocks.

3. The combination with a railway car truck, and a wheel applied to the same; of means for springing said wheel comprising an extension from the truck along the inner side of each wheel, the latter being chambered, a tube carried by the extension and directed into the wheel, said tube having its axis parallel to that of the wheel, a filler plate for the wheel and carried thereby, a shaft extended inwardly from the center of the filler plate, a bearing for the shaft carried by the tube and rotatable therein, a hub rotatable about the tube and formed with an eccentric enlargement, bearing means between the latter and the rim of the wheel, means between said extension and the eccentric portion of the hub resistant to the tendency of the same to rotate from the influence of road shocks, and a connection between the hub and the shaft bearing to render the latter and the hub jointly rotatable in relation to said tube.

4. The combination with a railway car truck, and a wheel applied to the same; of means for springing said wheel comprising an extension from the truck along the inner side of each wheel, the latter being chambered, a tube carried by the extension and directed into the wheel, said tube having its axis parallel to that of the wheel, a filler plate carried by the wheel, a shaft extended inwardly from the center of the filler plate, a member journaled in the tube and containing a bearing for the inner portion of the shaft, such member being eccentric to the latter, a hub rotatable about the tube, the hub being joined to said member and formed with an eccentric enlargement on the side of the shaft opposite from the eccentric portion of the member bearing means between the enlarged hub and the rim of the wheel, and means between said extension and the eccentric portion of the hub enlargement resistant to the tendency of the hub to rotate from the influence of road shocks.

5. The combination with a railway car truck, and a wheel applied to the same; of means for springing said wheel comprising an extension from the truck along the inner side of each wheel, the latter being chambered, a support carried by the extension and directed into the wheel, a hub rotatable about the support and formed with an eccentric enlargement, bearing means between the enlarged hub and the rim of the wheel, an arched coil spring substantially following the contour of the enlarged hub, such spring being located between and engaging the extension and the eccentric portion of the enlargement and being compressible in an arcuate path as the enlarged hub rotates about the support under the influence of road shocks, and retainer means directed from the support to engage the spring and prevent it from buckling on compression.

6. The combination with a railway car truck, and a wheel applied to the same; of means for springing said wheel comprising an extension from the truck along the inner side of each wheel, the latter being chambered, a support carried by the extension and directed into the wheel, a hub rotatable about the support and formed with an eccentric enlargement, bearing means between the enlarged hub and the rim of the wheel, an arched coil spring substantially following the contour of the enlarged hub, such spring being located between and engaging the extension and the eccentric portion of the enlargement and being compressible in an arcuate path as the enlarged hub rotates about the support under the influence of road shocks, and retainer means directed from the support to engage and retain the intermediate portions of the spring against buckling radially under the influence of compression.

7. The structure of claim 6, such retainer means comprising hook-shaped members engaging the coils of the spring from the outer side, and connections from said members to the support.

8. The structure of claim 6, such retainer means comprising hook-shaped members engaging the coils of the spring from the outer side, said support being a tube having its axis parallel to that of the wheel, and ring projections from said members journaled on the tube to render the members rotatable in harmony with the movements of the spring in said path.

JOHN J. PACHTER.

REFERENCES CITED

The following references are of record in the file of this patent:

UNITED STATES PATENTS

| Number | Name | Date |
| --- | --- | --- |
| 241,104 | Westlake | May 3, 1881 |
| 684,997 | Matheson | Oct. 22, 1901 |
| 1,222,588 | Allfree | Apr. 17, 1917 |
| 1,847,125 | Masury | Mar. 1, 1932 |
| 1,908,437 | Nelson | May 9, 1933 |
| 2,082,798 | Herold | June 8, 1937 |
| 2,097,970 | Edmunds | Nov. 2, 1937 |
| 2,377,232 | Herold | May 29, 1945 |
| 2,443,900 | Evans | June 22, 1948 |